Figure 1:

(No Model.)

T. A. EDISON.
METHOD OF INSULATING ELECTRICAL CONDUCTORS.

No. 438,309. Patented Oct. 14, 1890.

Witnesses

Inventor
Thomas A. Edison
By his Attorneys

UNITED STATES PATENT OFFICE.

THOMAS A. EDISON, OF LLEWELLYN PARK, NEW JERSEY.

METHOD OF INSULATING ELECTRICAL CONDUCTORS.

SPECIFICATION forming part of Letters Patent No. 438,309, dated October 14, 1890.

Application filed May 11, 1889. Serial No. 310,377. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in the Method of Insulating Electrical Conductors, of which the following is a specification.

The object of my invention is to produce an insulating material for electrical conductors which shall be of a tough and flexible nature, so as to be durable, and so as to permit of the bending of wires covered with it, and which shall also be non-inflammable and be possessed of superior insulating qualities.

The main feature of my invention consists in the use of gums or resins of that class of which gutta-percha and gum-balata are types—that is to say, those gums or resins which are tough and pliable like the two just mentioned. I prefer to use gum-balata on account of its cheapness. I mix such material with one of the halogen elements—preferably chlorine—in such a way as to displace the hydrogen in the material by the chlorine or other halogen, and this material I find to be fire-proof and otherwise suitable for insulating purposes.

The method I employ in preparing the material is to first dissolve the gum in a solvent which is not materially affected by the action of the halogen. When chlorine is employed, I prefer to use chloroform as the solvent. Through this solution of the gum in chloroform I pass the chlorine gas until the proper degree of chlorination is effected. I ascertain this by making from time to time a test of the material by making films of the material on glass plates and igniting or attempting to ignite such films. It will be seen that by this means I can determine not only the degree of flexibility which has been reached, but also the degree of inflammability. If too great a degree of chlorination is reached, the material is more brittle and less tough and flexible than when not so fully chlorinated, and it is therefore desirable to stop the operation at that point at which the desired degree of flexibility is attained, and the material is at the same time non-inflammable, which can readily be ascertained by experiment, as above indicated. Instead, however, of this, the chlorination may be carried so far that the film is somewhat brittle, and there may then be mixed with the chlorinated solution a small quantity of a solution of chloroform with the same gum which is not chlorinated. This will increase the flexibility of the material; but care should be taken not to add enough of the unchlorinated gum to make the material inflammable. Other adulterants may be used to produce different degrees of hardness.

The liquid material may be applied to wires or other bodies to be insulated by it in various ways. It may be concentrated by evaporation or distillation into a thick sirup, and the wires being first covered with cotton or other fibrous insulating material may be passed through the sirup, so that the cotton insulation becomes saturated therewith. After passing through the solution the wire may be passed through heated tubes or chambers, whereby the chloroform is evaporated from the solution. This produces a film of the chlorinated material on the wire, which is not only non-inflammable, but also moisture-proof.

The cotton or other fibrous insulating material may first be made non-inflammable by any of the ordinary processes now in use for this purpose.

Another way of applying the material to the wire is by evaporating the liquid from the solution, so that the material is reduced to the consistency of putty, in which form it can be placed on the wire by means of a die and press in the ordinary manner.

Figure 2:
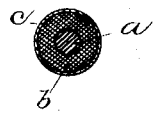

In the accompanying drawings, Figure 1 is a view in elevation, and Fig. 2 a cross-section, of a wire insulated according to my invention.

$a$ is the wire, $b$ the fibrous covering, and $c$ the external film of gum-balata or equivalent gum, which has been chlorinated, or in which the hydrogen has been displaced by one of the halogens, the parts being all shown exaggerated in thickness for the purpose of illustration.

All the halogen elements are substantial equivalents for the purposes of my invention; but chlorine is preferred, principally on account of its cheapness.

What I claim is—

1. The method of insulating electrical wires, which consists in displacing the hydrogen contained in balata or similar material by a halogen, and applying such halogenized material to the conductor, substantially as described.

2. The method of preparing balata or similar gum for insulating purposes, which consists in dissolving the gum in a solvent not affected by the action of a halogen, passing a halogen gas through the solution until the hydrogen in the material is sufficiently displaced by the halogen, substantially as described.

3. The method of preparing balata or similar gum for insulating purposes, which consists in dissolving the gum in a solvent of chloroform and passing through the solution of chlorine gas until the desired degree of chlorination is effected, substantially as described.

4. The method of preparing balata or similar gum for insulating purposes, which consists in dissolving the gum in a solvent, passing a halogen gas through the solution, and finally reducing the brittleness of the material by adding to the same a portion of the dissolved gum free from the halogen, substantially as described.

5. The method of insulating wire, which consists in passing such wire through a viscous mass of balata or similar gum which has been treated with a halogen, and passing the coated wire through a heated chamber, whereby the solvent is evaporated, substantially as described.

This specification signed and witnessed this 25th day of April, 1889.

THOS. A. EDISON.

Witnesses:
WILLIAM PELZER,
H. W. SEELY.